Feb. 16, 1932.　　J. J. WALLACE　　1,845,572
COTTON PRESS
Filed Feb. 7, 1931　　3 Sheets-Sheet 2

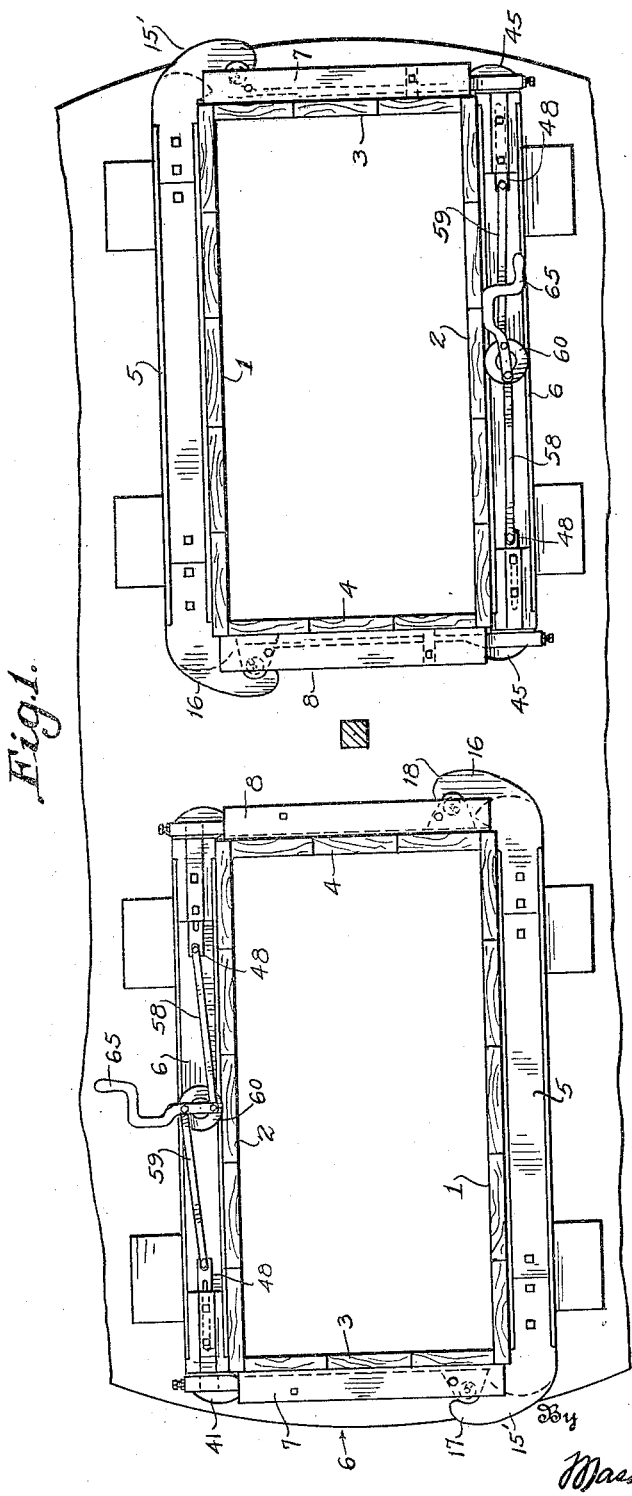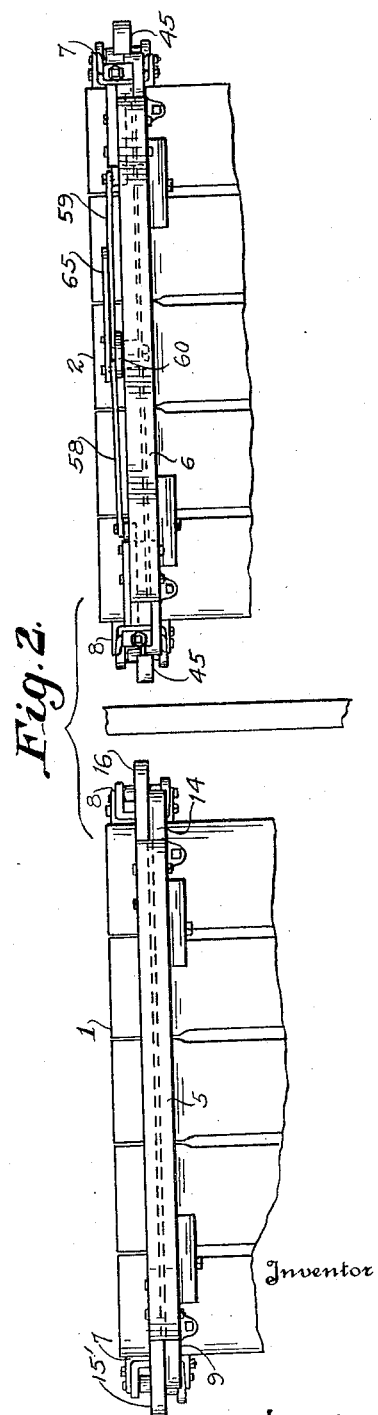

Inventor
Jeffrey J. Wallace
By Mason Fenwick & Lawrence
Attorneys

Feb. 16, 1932.  J. J. WALLACE  1,845,572
COTTON PRESS
Filed Feb. 7, 1931   3 Sheets-Sheet 3
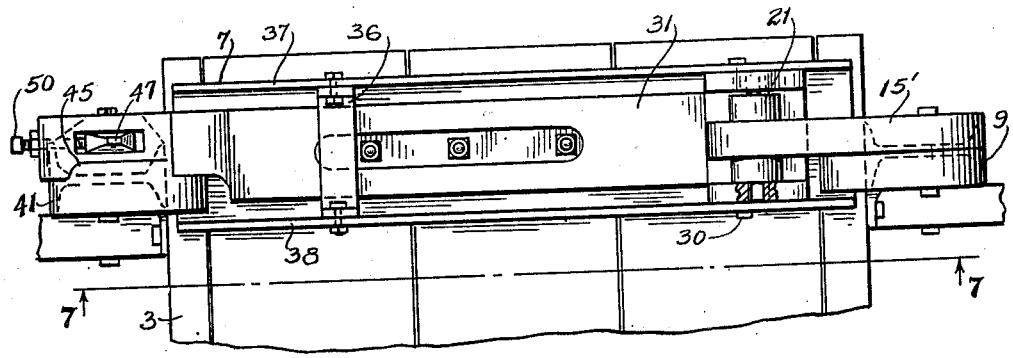
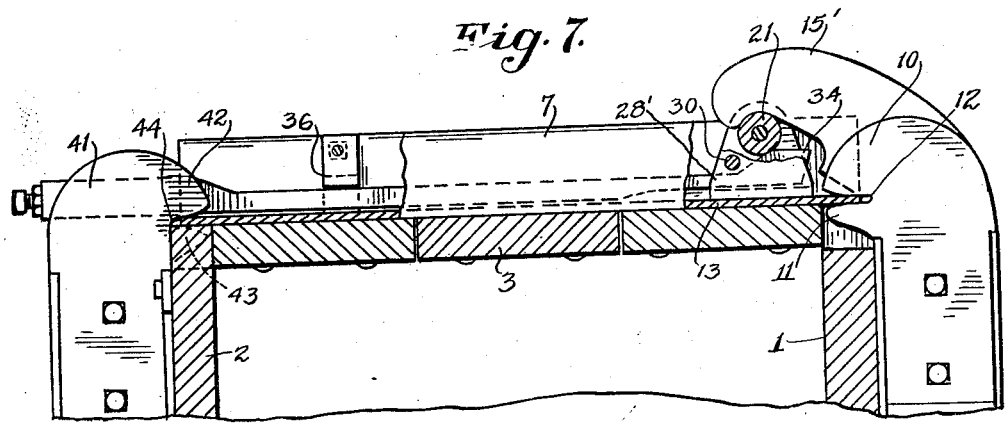
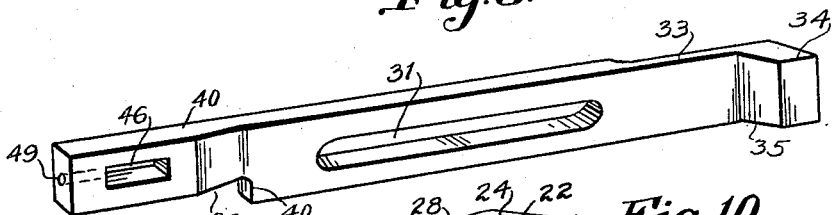
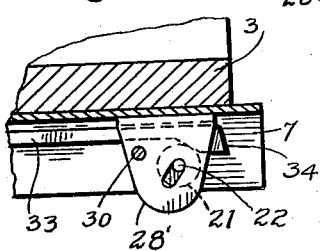
Inventor
Jeffrey J. Wallace
By Mason Fenwick Lawrence
Attorneys Patented Feb. 16, 1932

1,845,572

UNITED STATES PATENT OFFICE

JEFFREY JOHN WALLACE, OF AMITE, LOUISIANA, ASSIGNOR TO GULLETT GIN COMPANY, OF AMITE, LOUISIANA

COTTON PRESS

Application filed February 7, 1931. Serial No. 514,258.

The invention forming the subject matter of this application is an improvement over the apparatus disclosed in my copending application, Serial #376,172, filed July 5, 1929, and relates broadly to mechanism for locking and releasing the four doors or ends that constitute the upper part of the ordinary cotton press.

The main object of the present invention is to simplify apparatus of the character described so that the doors and ends of press boxes may be opened simultaneously, and similarly locked. The simultaneous opening of the doors and ends of boxes of this character is necessary to prevent the production of a lopsided or uneven bale, which inevitably results where one wall of the box is opened in advance of the other. The pressure of the cotton fed into the press box and tramped to form a bale is so tremendous and exerted in all directions that if any one of the doors or ends of the box be opened in advance of the other, the bale will be forced out of shape in the direction of the open door or end.

A further object of the invention is to utilize the pressure of the cotton, after the same has been compressed in the box, to operate on the locking mechanism disclosed herein in order to effect release of this locking mechanism automatically.

Other objects of the invention will become apparent as the detailed description thereof proceeds.

In the drawings:

Figure 1 is a top plan of a double box cotton press provided with the locking mechanism forming the present invention.

Figure 2 is a fragmentary side elevation of the upper end of the apparatus shown in Figure 1.

Figure 6 is an end elevation, on a greatly enlarged scale of the aforesaid locking mechanism.

Figure 7 is a horizontal section taken on the line 7—7 of Figure 6.

Figure 8 is a perspective view of a locking slide forming one of the essential elements of this invention.

Figure 9 is a fragmentary detail of a part of said locking mechanism; and

Figure 10 is a perspective view of one of the locking elements of the apparatus.

Figure 3:
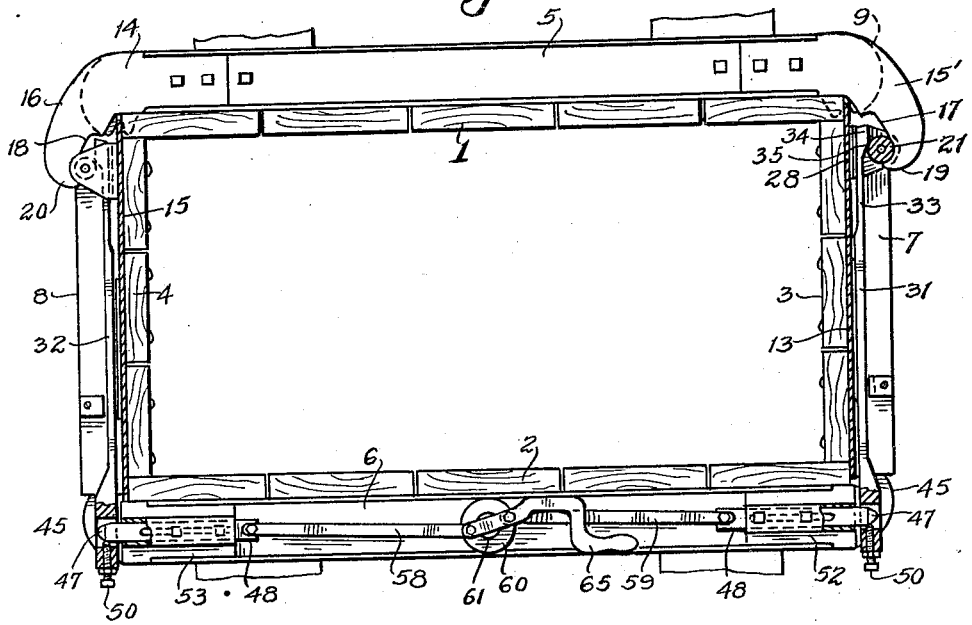
Figure 3 is a top plan of one of the aforesaid boxes with parts of the locking mechanism broken away and shown in section to illustrate details of construction.
Figure 4:
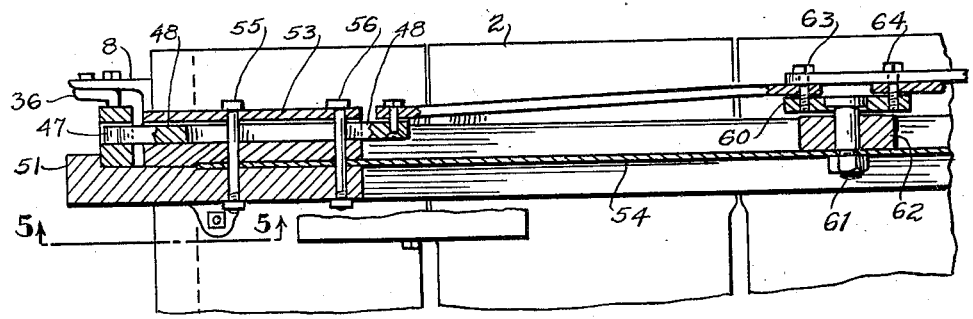
Figure 4 is a fragmentary vertical section, to a greatly enlarged scale, illustrating the details of part of the aforesaid locking mechanism.
Figure 5:
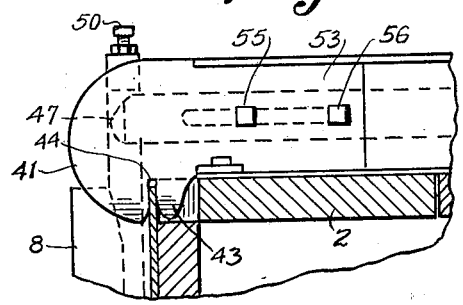
Figure 5 is a fragmentary top plan view of part of the locking mechanism at one of the corners of a press box.

As shown in the drawings, the locking mechanism is applied to the upper end of the doors 1 and 2 and to the removable ends 3 and 4, which with said doors, constitute the walls of the press box. This locking mechanism is operably mounted upon the I-beams 5 and 6, suitably secured to the doors 1 and 2, respectively, and near the upper ends thereof, and in the channel beams 7 and 8, suitably secured to the upper ends of the end walls 3 and 4, respectively. The aforesaid I-beams and channel beams are located at about the same height on their respective doors and walls in order to provide for proper cooperation of the locking mechanism mounted thereon.

One end of the I-beam 5 has a lug 9 suitably secured thereto. This lug extends beyond the end 3 of the press box and is provided with inwardly extending projections 10 and 11 separated by a slot 12 (see Figure 7). The slot 12 is adapted to fit snugly over the base 13 of the channel beam 7, and thereby serves to position the end wall 3 exactly in proper position relative to the doors 1 and 2. The other end of the I-beam 5 is provided with a lug 14 similar to the lug 9 and provided with similar projections to straddle the base 15 of the channel beam 8 and thereby position the end wall 4 properly with respect to the doors 1 and 2. These lugs 9 and 14 are secured to the lower face of the intermediate web of the I-beam 5.

Secured to the upper face of the intermediate web of the I-beam 5, and directly above the lugs 9 and 14, are the hook lugs 15' and 16 having their ends projecting inwardly of the box to provide arms 17 and 18, respectively, adapted to cooperate with roller mechanism to be described hereafter for the purpose of locking the end walls 3 and 4 in position. The projecting arms 17 and 18 are provided with recesses terminating in hooks 19 and 20, which are curved to seat a roller 21 (see Figure 10) forming part of the locking mechanism of this apparatus.

The roller 21 is provided at its opposite ends with trunions 22 and 23 which are slidably and rotatably mounted in slots 24 and 25, respectively, formed in the standards 26 and 27 projecting perpendicularly from a base 28'. The standards 26 and 27 are provided with apertures 28 and 29, adapted to register with corresponding apertures formed in the flanges of the channel beams 7 and 8 to receive a bolt 30 for securing the said roller and standards in proper position in the channel of said beams 7 and 8. As the rollers and standards carrying them are similarly constructed wherever used in this apparatus, the description of one will suffice for the description of all, and the several parts thereof are identified by the same reference characters throughout the drawings.

The channels of the beams 7 and 8 have slide bolts 31 and 32 mounted therein. One end of the bolt 31 has the back thereof recessed to compensate for the thickness of the base plate 28'; and the recessed part 33 is adapted to reciprocate between the base 28' and the roller 21. The end of the part 33 is provided with a lateral extension 34, having part thereof formed as an inclined plane 35 adapted to contact with the roller 21 and slide it lengthwise of the slots 24 and 25 into locking engagement with the hook end 19 of the arm 15'. The slide bolt 32 in the channel 8 is constructed similarly to the bolt 31 and is provided with the same means for sliding a roller 21 into locking engagement with the hook 20 of the projecting arm 16. It is not believed necessary to describe the several parts of these bolts separately because they are identically constructed and are therefore designated by similar reference characters.

The bolt 31 is retained slidably between the flanges of the channel beam 7 by means of a U-shaped plate 36 having the arms thereof suitably bolted or otherwise secured to the horizontal flanges 37 and 38 of the said beam 7 (see Figure 6). The other end of the bolt 31 is provided at its lower edge with a recess 39 forming an extension 40 which slides on a lug 41 (see Figures 6 and 7) which is suitably bolted or otherwise secured to the lower face of the intermediate web of the I-beam 6 and at one end thereof.

The lug 41 is provided with projections 42 and 43 serving the same purpose as the projections 10 and 11 on the lug 9, that is, to form a slot 44 adapted to receive the base 13 of the channel beam 7 for exactly positioning the door 2 with respect to the end wall 3 of the press box. The only difference between lug 41 and the lug 9 is that the lug 41 is provided on its upper part with a guide stop 45 which seats against the lower part of the extension 40 of bolt 31 in order to limit outward movement of the extension 40 with respect to the end of the door 2.

The extension 40 is provided with a slot 46 adapted to receive the tapered end 47 of a bolt 48 (see Figure 3) which is slidably mounted on the upper face of the intermediate web of I-beam 6. The extension 40 is provided with a screwthreaded aperture 49 which receives a set screw 50 having its inner end extending to the path of movement of the tapered end 47 of bolt 48. The adjustment of the screw 50 in the aperture 49 serves to compensate for wear on the tapered end 47 and also to regulate the distance through which the bolt 31 will be pulled against the resistance of the roller 21 with the inclined face 35 of said bolt, in order to regulate the closing pressure of the doors 2 and 5 with respect to the end wall 3.

The slide bolt mechanism in the channel beam 8 is exactly similar to that in the channel 7 and the lug 51 at the end of channel beam 8 is exactly similar in function with the lug 41, and form with lug 41 a pair of lugs for positioning the end walls 3 and 4 and securing the bolts 31 and 32 for proper sliding movement in their respective channel beams.

The bolts 48 are slidably mounted on the opposite ends of the I-beam 6 by means of the casings 52 and 53, each casing being suitably secured to the web 54 of the I-beam 6 by means of bolts 55 and 56 which also pass through a slot 57 formed in the bolts 48 to guide said bolts and limit its movement inwardly and outwardly on the web 54.

The bolts 48 on opposite ends of the beam 6 have their adjacent ends pivotally connected to links 58 and 59 which have their opposite ends pivotally connected to a disc 60 which is rotatably mounted on the web 54 by means of a pivot bolt 61 and spacing washer 62. The links 58 and 59 have their pivot screws 63 and 64 secured to the disc 60 at diametrically opposite points; and a handle 65 is pivoted to each of these screws 63 and 64 for simultaneously moving the links 58 and 59, and bolt connected thereto toward and from each other in the releasing and locking operations of said mechanism.

It will be noticed particularly from Figure 3 that the diameter of the disc is such as to cause the pivot 61 to be arranged with respect to the outer face of the door 2 at such distance that when the bolts are in locking position the side of the handle 65 is in contact with the face of the door 2 and the pivots 63 and 64 tend to hold the handle 65 against the face of door 2 and thereby retain the bolts 48 in locking position. The pressure of the screws 50 against the inclined faces of the tapered end 47 tends to keep the links 58 and 59 continually pressing toward each other and thereby keeping the handle 65 in locked position against the door 2.

It will be obvious from inspection of Figure 3 particularly that when the door and end walls are in locked position, the pressure of the cotton in the press box will be exerted equally on the said walls and doors. When the box is filled and ready to be baled the act of pulling the handles 65 outwardly from the face of the door 2 will cause a simultaneous release of the doors and end walls from each other. This is due to the fact that the outward pressure of the cotton on the end walls 3 and 4 causes a continuous pressure of the inclined plane 35 of the slide bolts 31 and 32 against the roller 21; and this pressure causes an automatic sliding of the said bolt in the direction of the door 1 immediately upon release of the bolts 48 from the apertures 46 in the extensions of said bolts.

In the double box arrangement shown in Figures 1 and 2, one of the boxes is shown with a locking mechanism in its released position, while the other box is shown with it in locking position. Since the elements on each box are exactly similar, they are identified by the same reference characters in order to avoid confusion.

While I have shown a specific embodiment of my locking mechanism herein, it is to be understood that the invention is not to be limited in any way to the use of said specific embodiment, but that its scope is commensurate in bredth with that of the claims appended hereto.

What I claim is:

1. In a press box having four collapsible sides detachably connected to each other, channel beams secured to the opposite sides of said box and having their central body parts extending to the edges of each of said opposite sides, hook members mounted on the other two sides of said box and provided with slots to engage said central body part for positioning the sides relative to each other, the flanges of each channel member having rollers slidably and pivotally mounted therein, hooks extending inwardly from the opposite ends of one of said sides and adapted to receive the said rollers, bolts slidably mounted in said channel beams and engageable with said rollers to move them into locking contact with said hooks, and means slidably mounted on the side opposite the said hooks for simultaneously moving said bolts for locking the sides in assembled position.

2. In a press box having four collapsible sides detachably connected to each other, channel beams secured to the opposite sides of said box and having their central body parts extending to the edges of each of said opposite sides, hook members mounted on the other two sides of said box and provided with slots to engage said central body parts for positioning the sides relative to each other, locking mechanism mounted in each channel beam, and means slidably mounted on one of said sides for operating said mechanisms simultaneously.

3. A press box having four collapsible sides, slotted lugs projecting from the opposite ends of each of a pair of opposite sides, means on the other pair of sides to engage said lugs and locate the sides relative to each other in assembled position, a pair of hooks projecting inwardly from the opposite ends of one of said sides, and means slidable on the other three sides to cooperate with said hooks in simultaneously locking all of said sides in assembled position.

4. A press box having four collapsible sides, means fixed to said sides for locating them in a predetermined assembled relation, cooperative means fixed to one of said sides and slidably mounted on the other three sides for simultaneously locking all of said sides in assembled relation.

In testimony whereof I affix my signature.

JEFFREY JOHN WALLACE.